United States Patent
Pacione

(10) Patent No.: US 6,217,974 B1
(45) Date of Patent: Apr. 17, 2001

(54) CARPET AND LAYERED BACKING FOR DIMENSIONAL STABILITY AND INTEGRITY

(75) Inventor: Joseph R. Pacione, Thornhill (CA)

(73) Assignee: Tac-Fast Georgia, L.L.C., Atlanta, GA (US)

( * ) Notice: Subject to any disclaimer, the term of this patent is extended or adjusted under 35 U.S.C. 154(b) by 0 days.

(21) Appl. No.: 08/973,596

(22) PCT Filed: Jun. 10, 1996

(86) PCT No.: PCT/CA96/00406

§ 371 Date: Mar. 30, 1998

§ 102(e) Date: Mar. 30, 1998

(87) PCT Pub. No.: WO96/41913

PCT Pub. Date: Dec. 27, 1996

(51) Int. Cl.[7] ............................ B32B 33/00; B32B 5/02
(52) U.S. Cl. ................................ 428/95; 428/96
(58) Field of Search ........................ 428/95, 96, 99, 428/100

(56) References Cited

U.S. PATENT DOCUMENTS

| 3,309,259 | 3/1967 | Schwartz | 428/96 |
|---|---|---|---|
| 3,322,607 | 5/1967 | Jung | 428/96 |
| 3,325,323 | 6/1967 | Forkner | 428/95 |
| 3,360,421 | 12/1967 | Sands | 428/95 |
| 3,414,458 | 12/1968 | Lacy | 428/95 |
| 4,093,763 | 6/1978 | Hartmann et al. | 428/95 |
| 4,096,302 | 6/1978 | Thibodeau et al. | 428/95 |
| 4,172,166 | 10/1979 | Hartmann et al. | 428/95 |
| 4,210,690 | 7/1980 | Hartmann et al. | 428/95 |
| 4,342,802 | 8/1982 | Pickens, Jr. et al. | 428/95 |
| 4,389,443 | 6/1983 | Thomas et al. | 428/95 |
| 4,390,582 | 6/1983 | Pickens, Jr. et al. | 428/95 |
| 4,391,866 | 7/1983 | Pickens, Jr. et al. | 428/95 |
| 4,412,877 | 11/1983 | Vosburgh | 428/95 |
| 4,522,857 | 6/1985 | Higgins | 428/95 |
| 4,622,253 | 11/1986 | Levy | 428/95 |
| 4,770,917 | 9/1988 | Tochacek et al. | 428/95 |
| 4,822,658 | 4/1989 | Pacione | 428/95 |
| 5,199,141 | 4/1993 | Trask et al. | 428/95 |
| 5,216,790 | 6/1993 | Eschenbach | 428/95 |
| 5,219,647 | 6/1993 | Vock et al. | 428/284 |
| 5,346,757 | 9/1994 | Nakata | 428/95 |

FOREIGN PATENT DOCUMENTS

| 0325473 | 7/1989 | (EP) . | |
| 1006599 | 10/1965 | (GB) . | |
| 9400043 | 1/1994 | (WO) | A47G/27/04 |

*Primary Examiner*—Terrel Morris
*Assistant Examiner*—Cheryl Juska
(74) *Attorney, Agent, or Firm*—Brian W. Gray; John C. Hunt; Blake, Cassels & Graydon, LLP

(57) ABSTRACT

A carpet structure and backing of superior dimensional stability and integrity which is especially useful in a free float system of installation. In one aspect of the invention, a carpet is provided having a selected dimensional stability in which there is (i)a first carpet part having a primary layer with pile substantially covering a first side of the layer, the pile tufted through the primary layer to leave tuft bundles on a second side of the primary layer and a binder encapsulating the tuft bundles, the first part having a predetermined force of expansion and contraction under cycling conditions of temperature and moisture; (ii) a second part in layered relationship to the first carpet part, the second carpet part constructed from one or more layers to have a predetermined resistance to expansion and contraction at least equal to or greater than the force of expansion and contraction of the first carpet part under cycling conditions of temperature and moisture and traffic loads on the carpet pile.

101 Claims, 5 Drawing Sheets

CARPET AND LAYERED BACKING FOR DIMENSIONAL STABILITY AND INTEGRITY

FIELD OF THE INVENTION

This invention relates to a new carpet structure with increased dimensional stability and integrity, and particularly one which is useful with a hook and loop installation system as disclosed in for example U.S. Pat. No. 4,822,658.

BACKGROUND OF THE INVENTION

Most carpets have some form of dimensional stability problems due to changes in temperature and humidity and also due, in some cases, to the lack of integrity from high traffic and heavy rolling stock etc. These problems are particularly acute when nylon is used as the primary pile layer since nylon absorbs moisture and expands up to approximately 6% of its weight. In many other ways, however, nylon is a preferred form of material for use in making carpet because of its durability and cost.

Typically nylon is used to make the pile of the carpet and it is tufted into a polypropylene primary backing to which it is bound by a predominantly latex binder applied to the underside of the backing.

The nylon pile tufted into the primary backing by itself is flexible and relatively stable, resisting buckling or wrinkling from atmospheric changes in moisture or temperature. However, this intermediate product does not have the stability, mass or tuft bind to be a carpet. It is a mere piece of textile. Typically, integrity is added to this primary backing by the addition of a latex binder to bind the tuft bundles left below the primary backing together to add weight, stability and durability to the backing. However, as soon as this is done, problems can arise because of fiber growth in the primary pile due to atmospheric changes in relative humidity and temperature, leading to increased stress on the carpet as a whole. This can result in wrinkling, buckles and delamination, and in heavy traffic zones, reduce carpet integrity.

As disclosed in U.S. Pat. No. 4,822,658, a method has been developed of installing a carpet through the use of a hook and loop system. The most economical form of such installation is the attachment of the carpet at the perimeter and along the seams. This is essentially a "free float system". It is therefore desirable in such a system to have a carpet of inherent dimensional stability and integrity, particularly under conditions of humidity changes and high traffic.

Attempts have been made to prevent the growing and distortion of some forms of carpet, especially carpet tiles or carpets of 6 feet width or less, by making it heavier and heavier and by locking the nylon of the pile into the backing more rigidly with more and more binder, adhesive or glue. Other attempts have been made to give greater dimensional stability to the carpet by putting fiberglass into the backing. While these attempts can create more dimensional stability, they do not completely satisfy the need for atmospheric stability and integrity for the great majority of carpets, particularly wide width carpets of greater than 6 feet. Most such carpets still require adhesion to the floor across substantially all of their underside, typically by gluing to maintain atmospheric stability and integrity. This construction thus makes it difficult to install a carpet in a "free-float" system, i.e. one in which the carpet is installed only along its perimeter and seams.

One approach to this problem has been to moisten the carpet during installation prior to securing the carpet to the floor, as described in U.S. Pat. No. 5,479,755, issued to Pacione on Jan. 2, 1996. Moistening is done to deliberately cause the carpet to expand and then the carpet is affixed in place by the hook and loop system. This approach, however, does not teach how to obtain a carpet which does not swell to begin with when the nylon pile fibres become wet.

Also since carpet piles can differ, since the required stability and strength of carpets varies widely depending upon the anticipated use, and since cost plays a part in an item like carpet which is supplied in very large volume, it is desirable to have a series of constructions which can be used to engineer a carpet to a desired stability according to predetermined criteria so as to meet the anticipated conditions of use and cost. It is helpful if such constructions are able to be selected as required to achieve a predetermined selected dimensional stability and level of required integrity.

SUMMARY OF THE INVENTION

The invention is achieved in part by recognizing, on the one hand, that increasing binder weight and density on the underside of the primary layer aggravates, rather than alleviates, the atmospheric stability problem in carpets and by the further recognition that flexible dimensionally stable light weight secondary layers can be added as needed as backings to give the required stability to the primary layer.

The present invention provides a carpet structure and backing of superior dimensional stability and integrity which is especially useful in a free float system of installation.

In one aspect of the invention, a carpet is provided having a selected dimensional stability comprising:

(i) a first carpet part comprising a primary layer with pile substantially covering a first side of the layer, the pile tufted through the primary layer to leave tuft bundles on a second side of the primary layer and a binder encapsulating the tuft bundles, the first part having a predetermined force of expansion and contraction under cycling conditions of temperature and moisture;

(ii) a second part in layered relationship to the first carpet part, the second carpet part constructed from one or more layers to have a predetermined resistance to expansion and contraction at least equal to or greater than the force of expansion and contraction of the first carpet part under cycling conditions of temperature and moisture and traffic loads on the carpet pile.

In another aspect, carpet backing for use on a carpet to be installed on a floor by means of hooks complimentary and attachable to loops on the back of such backing is provided comprising:

(i) a first spun web layer;

(ii) loops needled into and through the first layer to substantially cover a first side of the layer with exposed loops;

(iii) a binder on the second side of the layer to lock the loops into the layer.

Here, the substrate of the backing can be thermally bonded to stabilize the substrate.

The substrate can be point bonded.

The substrate can be non-woven.

A second layer of spun web substrate can be adhered to the first layer on the side opposite the exposed loops.

The binder can also bond the first and second layers together.

The second layer can be non-woven.

The second layer can be point bonded.

Additional spun web layers of the backing can be adhered as needed to create a carpet of a selected dimensional stability.

The first layer can be spun web non-woven thermally bonded polyester.

The binder can contain a fire retardant chemical treatment.

Loops can be needled into the first layer by the malimo process.

The amount and viscosity of the binder on the second side of the substrate can be matched with the density of the substrate so that such binder penetrates both sides of the substrate to lock the loops into the substrate but without clogging the loops on the first side.

In another aspect, the invention is a carpet having a selected dimensional stability comprising:

(i) a first carpet part comprising a primary layer with pile substantially covering a first side of the layer, the pile tufted through the primary layer to leave tuft bundles on a second side of the primary layer and a binder encapsulating the tuft bundles, the first part having a predetermined force of expansion and contraction under cycling conditions of temperature and moisture;

(ii) a second part in layered relationship to the first carpet part, the second carpet part constructed from one or more layers to have a predetermined resistance to expansion and contraction at least equal to or greater than the force of expansion and contraction of the first carpet part under cycling conditions of temperature and moisture and traffic loads on the carpet pile.

The second carpet part can be constructed from one or more layers of the following:

(a) a woven layer
(b) a non-woven layer
(c) a foam layer and a binder chemically compatible to and interposed between the layers to bind the layers together.

The non-woven layer can be spun web.

The spun web layer can be thermally bonded.

The spun web layer can be point bonded.

The binder can encapsulate the tuft bundles and be such that it does not form a layer substantially deeper than the tops of the tuft bundles.

The binder encapsulating the tuft bundles can contain voids within and around the tuft bundles to allow for expansion and contraction of the bundles.

The carpet can be such that there is needled into the bottom layer loops substantially covering the underside of the bottom layer.

The carpet can be such that the loops are locked to the bottom layer by the binder binding such layer to the layer above.

In another aspect a carpet backing is provided for use on carpets to be installed on a floor by means of hooks complimentary and attachable to loops on the back of such backing comprising:

(i) a nor-woven spun web polyester layer;
(ii) loops needled into and substantially covering a first side of the substrate;
(iii) means to lock the loops into the substrate.

The backing can be such that the means to lock the loops include a binder applied to a second side of such substrate and in which the amount and viscosity of the binder are matched with the density of the substrate so that such binder penetrates both sides of the substrate to lock the loops into the substrate but without clogging the loops on the first side.

The substrate can be stabilized by point bonding.

The coating can be applied to the second side of the substrate to reduce the penetration of the binder into the substrate.

There can be a foam layer which is bonded to the non-woven spun web substrate on the side opposite the loops.

The foam layer can have voids or spaces to match the expansion and contraction of the carpet backing.

In another aspect a carpet for installation on a floor by means of hooks that are complementary and attachable to loops on a back side of the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder containing voids within and around the tut bundles to allow for expansion and contraction of the bundles; and a backing layer having a first side secured to the second side of the primary layer and a second side having said loops thereacross, the loops being locked in the backing layer.

In another aspect the invention is a carpet for installation on a floor by means of hooks that are complementary and attachable to loops on a back side the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder being sufficiently malleable, flexible, supple, pliant, or yielding to permit expansion of tuft bundles encapsulated so as to preclude substantial expansion or buckling of the carpet; and a backing layer having a first side secured to the second side of the primary layer and a second side having said loops thereacross, the loops being locked in the backing layer.

The carpet can be such that the backing layer includes a spun web substrate having the loops needled into and through the substrate and the binder locks the loops in the backing layer.

The backing layer can include a spun web substrate having the loops needled into and through the substrate and the binder locks the loops in the backing layer.

There can be a coating is applied to the substrate to reduce the penetration of the binder into the substrate.

The backing layer can include a first spun web substrate having loops needled into and through the substrate and there can be a second binder that locks the loops in the backing layer.

Again there can be a coating which is applied to the substrate to reduce the penetration of the second binder into the substrate.

The backing layer can include a second spun web substrate located between the first spun web substrate and the primary layer.

The first spun web substrate can be secured to the second spun web substrate by said second binder.

The first spun web substrate can be relatively light and the second spun web substrate can be relatively heavy.

The backing layer can include a foam layer located intermediate the primary layer and the loops.

The backing layer can include a spun web substrate intermediate the primary layer and the foam layer.

The spun web substrate can be secured to the primary layer by the binder.

The foam layer can be slab foam.

The foam layer can be mechanically frothed foam.

The foam layer can be directly bonded to the binder.

The substrate can be point bonded.

The substrate can be non-woven.

The substrate can be thermally bonded polyester.

The pile can be nylon.

The first layer can be polypropylene.

The second binder can be selected from latex, ethylene vinyl acetate and urethane.

The binder can include a fire retardant chemical.

The loops can be needled into the substrate by a malimo process.

The invention includes a method for manufacturing a laminate carpet having an upper pile component and lower backing layer, the method comprising:

manufacturing the upper pile component with a layer having pile tufted therethrough and secured to the layer;

determining the force of expansion of the upper component when exposed to moisture;

securing a first side of a backing layer having loops for attachment to complementary hooks on its second side to an underside of the upper component; wherein the backing layer is selected so as to be sufficiently rigid to meet or exceed the determined force of expansion of the upper pile component in the assembled carpet so as to substantially preclude expansion and buckling of the carpet due to moisture absorption when the carpet is installed as part of a free float installation.

The pile can be nylon.

Determining the force of expansion can include wetting the upper pile component, permitting the component to expand to its maximum width, fixing the component at its edges, and permitting moisture to evaporate from the component and measuring the force of contraction of the component.

The pile tufts can be secured to the layer of the upper component by a binder.

The backing layer can include a spun web substrate.

The loops can be locked into the substrate by a binder and there can be a coating applied to the substrate to reduce the penetration of the binder into the substrate.

The can be a binder encapsulating tuft bundles to secure the layer of the upper pile component pile and pile together, the binder containing voids within and around the tuft bundles to allow for expansion and contraction of the bundles, and/or the binder can be sufficiently malleable to permit expansion of encapsulated tuft bundles so as to preclude substantial expansion of the carpet.

A BRIEF DESCRIPTION OF THE DRAWINGS

Certain embodiments of the invention are described below with reference being made to the accompanying drawings wherein.

DESCRIPTION OF PREFERRED EMBODIMENTS

In one aspect, the upper composite portion of a carpet of the present invention includes a binder which is applied to the backside of a primary backing for securing the needled tufts to the backing. The binder is selected so that it can accommodate swelling or expansion of the tuft fibres. In a finished carpet, to the upper portion is added a lower backing of sufficient strength to lend the carpet the integrity required for installation and use.

In preferred embodiments, the binder of the upper composite portion can be a binder having air entrained thereinto to accommodate fibre expansion, or the binder can include a conventional latex with a lower amount of filler than is conventionally present. In the latter case, the latex is more gummy and less rigid than latex compositions currently applied to the backside of the primary backing of a carpet. It is generally true that the greater the degree to which the binder can accommodate fibre expansion, the less atmospheric stability that is required to be engineered into the lower backing.

The carpet is rendered dimensionally stable by on the one hand matching the anticipated expansion and contraction of the first carpet part being the fibre pile the primary layer and the binder for the tuft bundles below the primary layer with a matching force of stability in the second carpet part composed of, preferably non-woven spun web polyester in sufficient layers. The predetermined stability is introduced by the number and type of layers, the material used for each layer, the use of woven or non-woven layers, thermally bonded, point bonded or not point bonded and the mass of binder and the degree of encapsulation of the tuft bundles. If less binder mass is used and if voids are provided around the tuft bundles then generally less atmospheric stability needs to be engineered into the backing.

Figure 1:
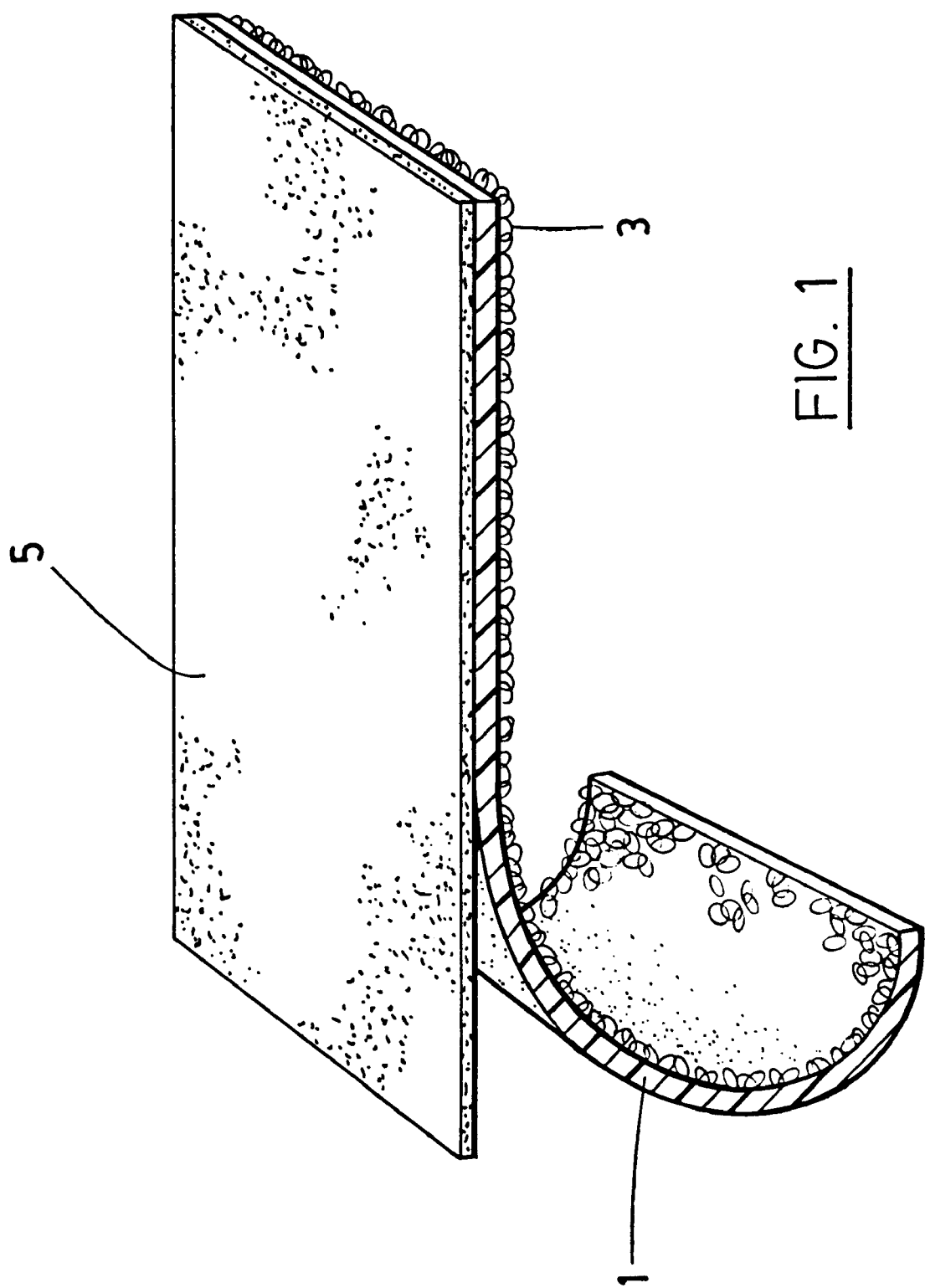
FIG. 1 is a sectional view of a carpet backing made in accordance with the present invention.

As shown in FIG. 1, there is provided a layer of, preferably, spun web polyester 1. This layer can be thermally bonded (for example, point bonded) or not depending upon the amount of stability required in the layer. Needled into the layer, preferably by the malimo process are loops 3, preferably made from polyester filaments. The loops are locked into the layer by a coating of a compatible binder 5 which preferably penetrates the spun web substrate layer sufficiently to encapsulate the loop fibers into the layer, but does not penetrate into the loops to substantially impair their ability to mesh with corresponding hooks for installation as described in U.S. Pat. No. 4,822,658.

Figure 2:
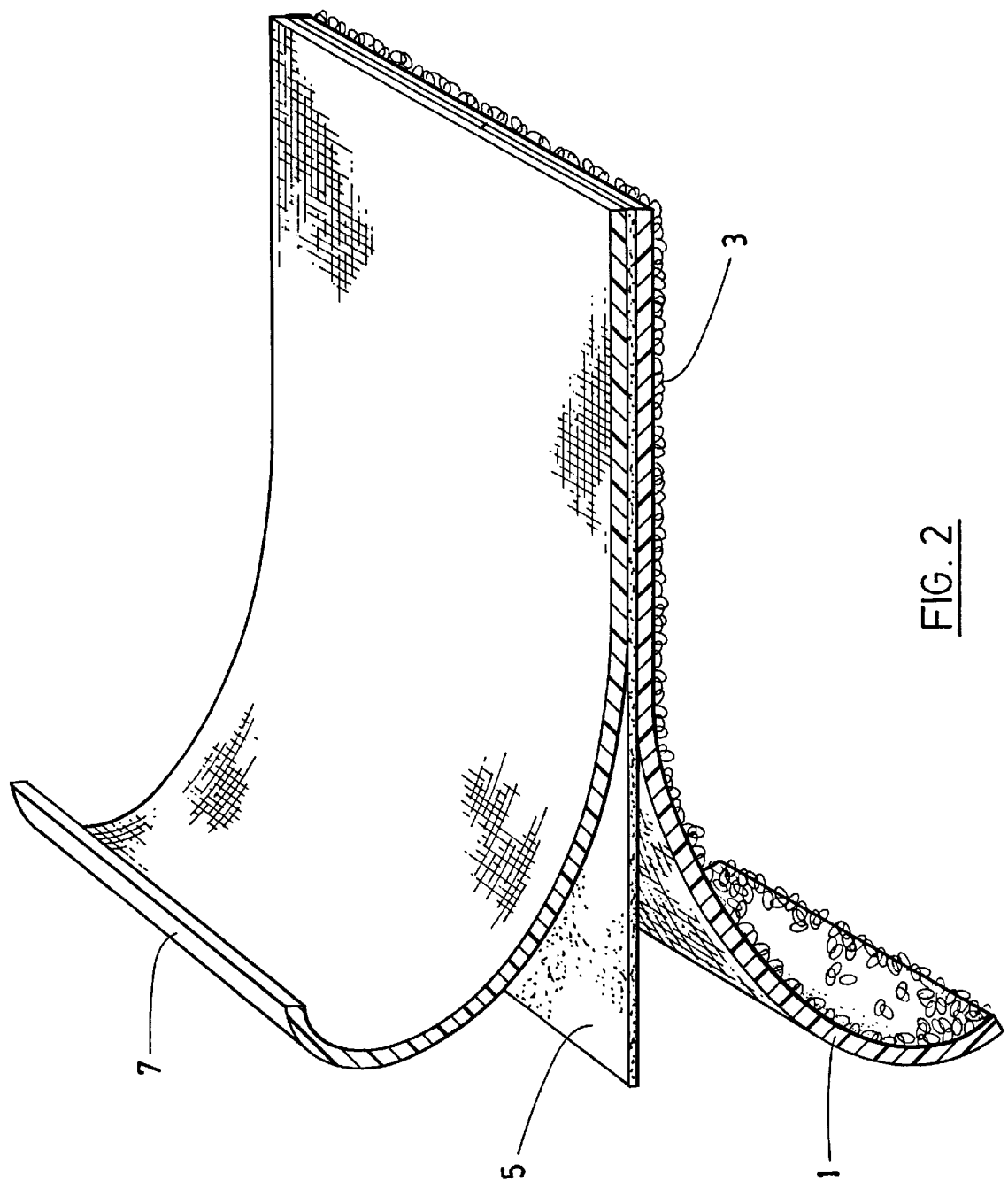
FIG. 2 is a backing having a second spun web layer.
Figure 3:
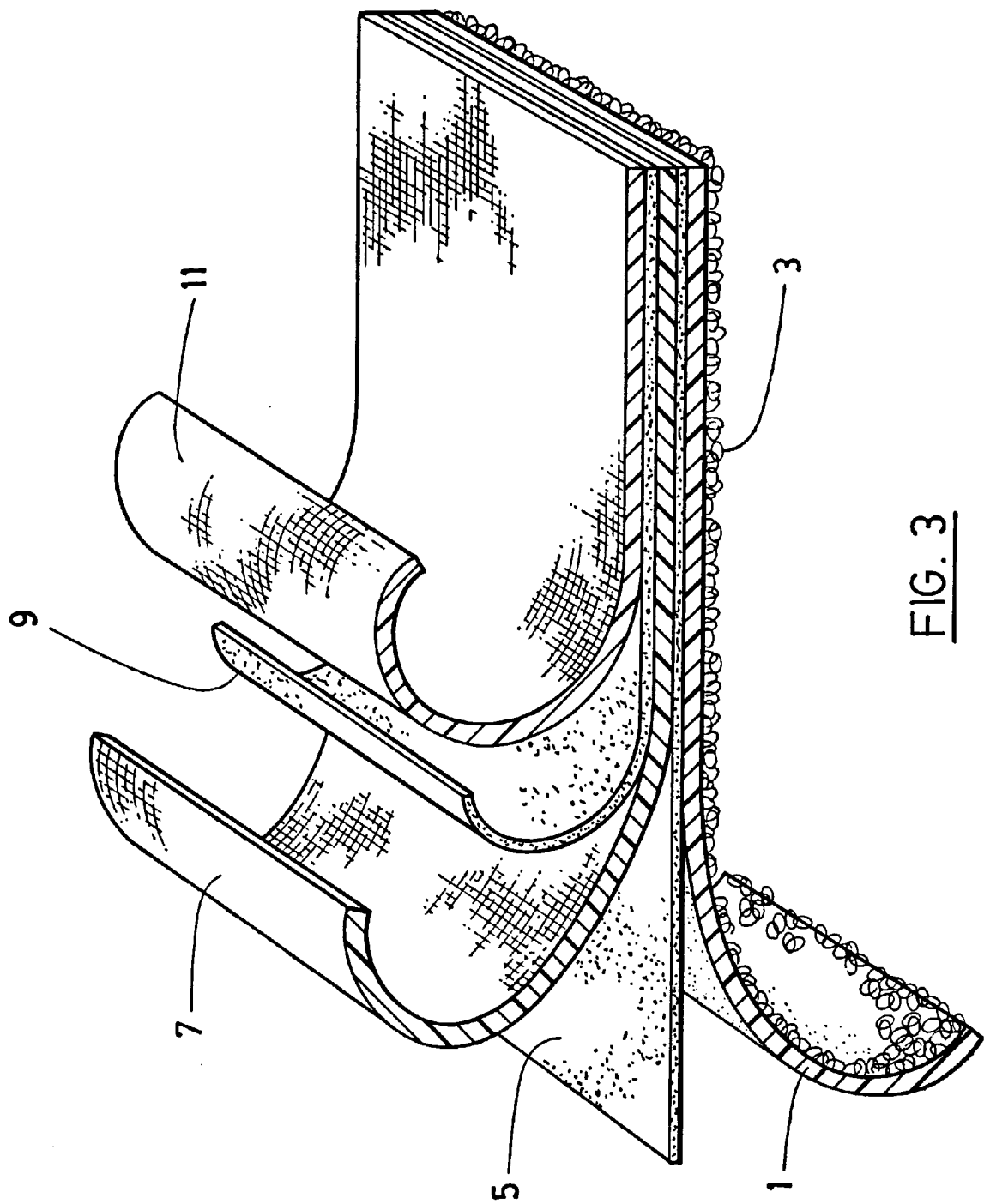
FIG. 3 is an alternative backing having two extra spun web layers.

In addition as disclosed in FIG. 2, the backing contains a first spun web layer 1, loops 3 and a binder or coating 5. An additional layer of the preferred spun web polyester 7 may be adhesively bonded to the first layer to add greater dimensional stability to the carpet backing. In a particular FIG. 2 embodiment, layer 1 is relatively light nonwoven spun web material into which is readily needled the layer of loops 3. Needling weakens this layer, and it is preferable to add a further layer 7 for dimensional stability. Adhesive or binder 5 is applied in line to the reverse side of the backing followed by application of layer 7. The binder serves to lock the loops in layer 1 and to secure the layers together. Layer 7 is relatively heavy compared to layer 1 and is sufficiently rigid that the overall carpet composite has the integrity required for installation and use. Further, other layers can be added as required as shown in FIG. 3 in which a second adhesive coating or binder 9 and a third layer of the preferred spun web polyester 11 are added.

Suitable spun web material is of the sort described in U.S. Pat. Nos. 4,093,763; 4,172,166 or commercially available under the name COLBAG from Akzo Nobel of Holland or the name LUTRADUR from Freudenberg Spunweb Co. of Durham, N.C.

It is also possible that the spun web layers may first be precoated prior to the addition of the adhesive or binder layers 5, 9 to limit the penetration of the adhesive or binder into the spun web layers, if that is desired. Such an application would be particularly beneficial in the case of layer 5 in order to preclude substantial bleeding of adhesive into loops 3.

Figure 4:
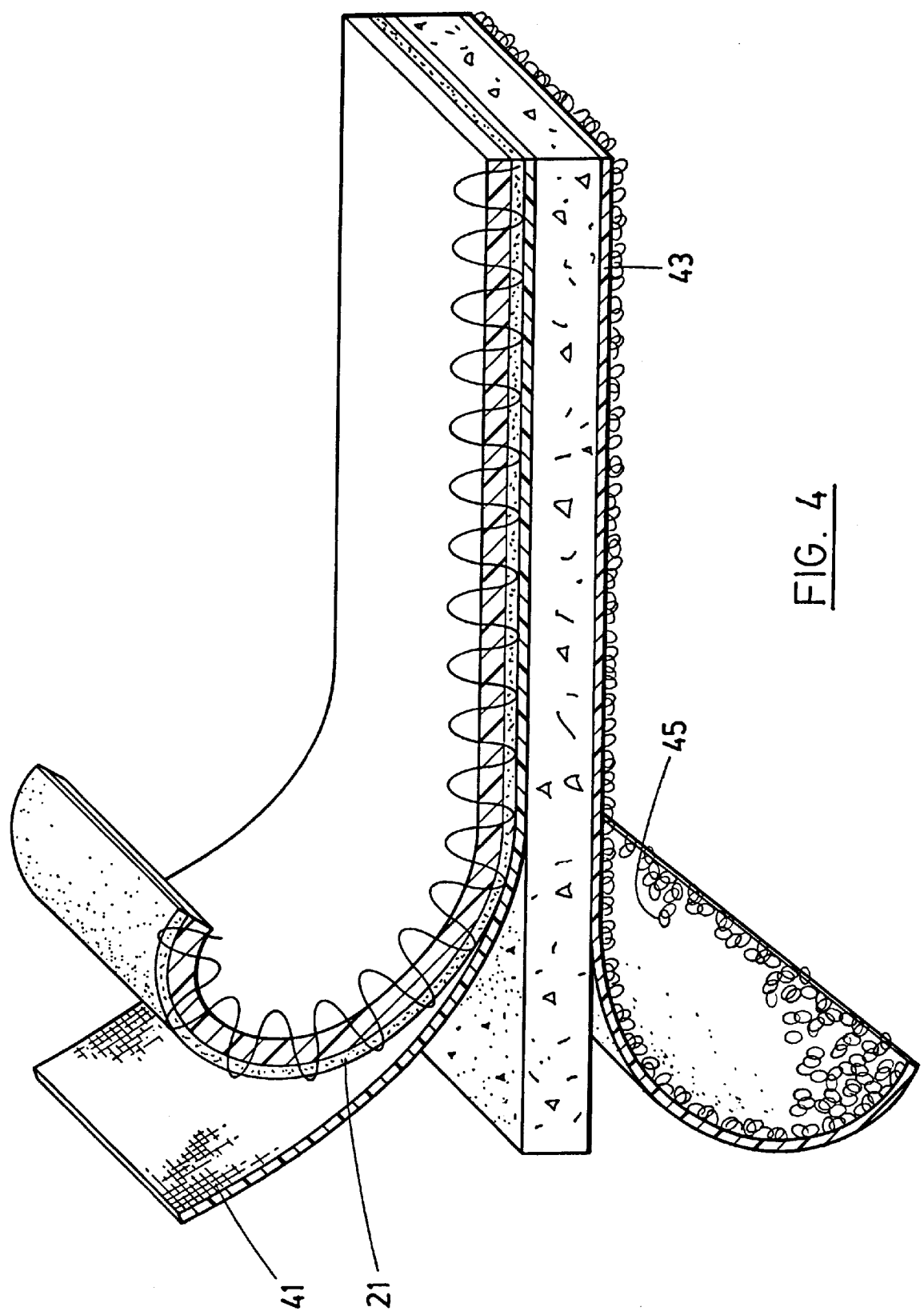
FIG. 4 is an alternative backing having a foam layer.

As shown in FIG. 4, a layer of polyurethane foam 13 can also be included as part of a carpet construction of the present invention. This can be added both to provide cushioning and mass to the carpet. In this case, binder 21 is applied to the back of the primary backing and spun web layer 41 is applied in line to be bonded directly thereto. Foam layer 13 can be applied directly in line by mechanical frothing or it can be chemically blown. Tricot layer 43 having locked loops 45 on it underside is applied in line to the foam. Alternatively, a foam (which can be slab foam) and tricot composite can be separately manufactured and adhesive used to secure the foam and spun web layers.

Figure 5:
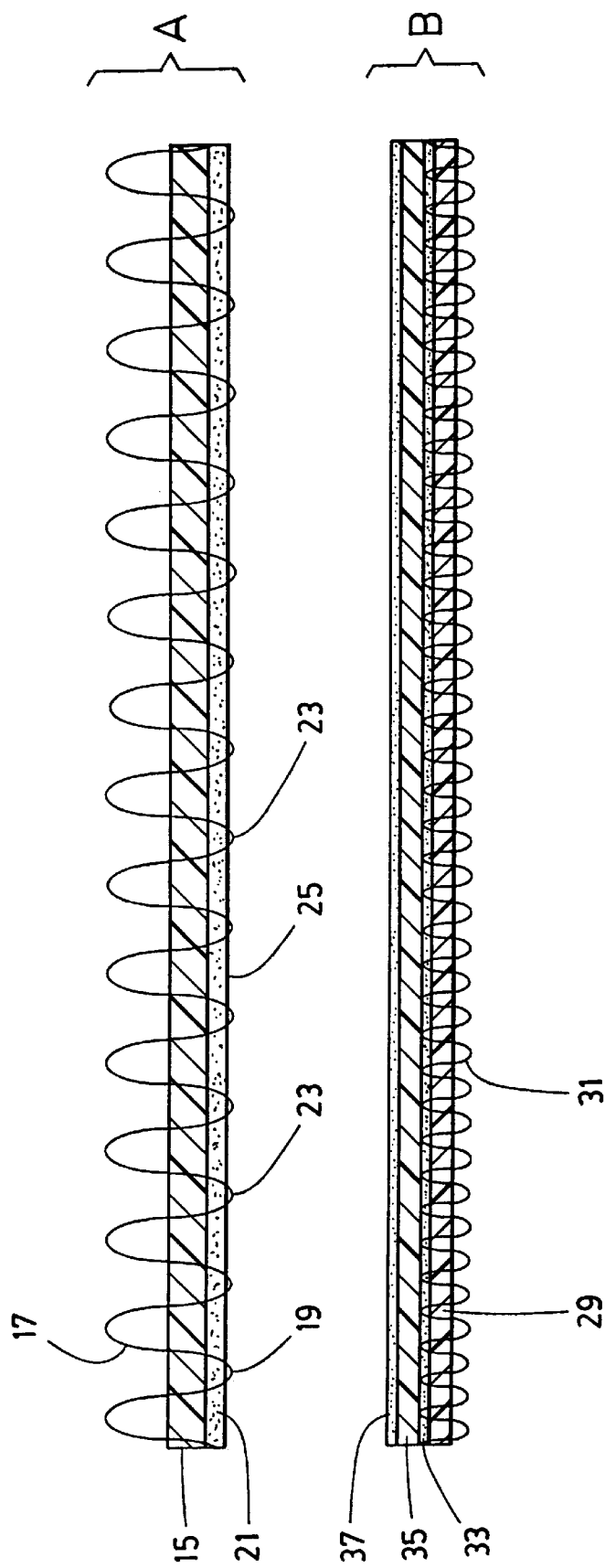
FIG. 5 is a sectional view of a carpet and backing in accordance with this invention.

Shown in FIG. 5 is one form of carpet which can be made using this invention. It should be recognized that any of the backings shown in FIGS. 1–4 could be used with the carpet construction of this invention as long as the predetermined expansion and contraction of the first carpet part, shown as A in FIG. 5 under cycling conditions of temperature and moisture (humidity) is at least equalled or exceeded by the predetermined resistance to expansion and contraction of the second carpet part "B" shown in FIG. 5.

As shown in FIG. 5, the first carpet part consists of a polypropylene backing 15 and nylon pile 17 which has been tufted through the backing normally in a continuous strand.

Such tufting leaves tuft bundles 19 below the primary layer 15. The ability of these tuft bundles 19 to expand and contract plays a significant role in the tendency of the first carpet part A to buckle under changes in temperature or humidity. Some form of binder is necessary to achieve any degree of tuft bind, i.e. a situation in which the nylon tufts 17 cannot easily be pulled from the backing 15. Thus the tuft bundles 19 are encapsulated to the minimum extent necessary in a binder 21 which is typically polyurethane. The amount of polyurethane should be minimized, preferably so that the layer 21 does not extend beyond the tops 23 of the tuft bundles. This can be achieved in part by the use of a doctor blade after application of the binder and before it has set. The doctor blade wipes along the surface created by the tops of the tuft bundles and to some extend within the valleys 25 to minimize the amount of binder 21 on the first carpet part A. If possible, some voids or spaces, such as at 25, may be left.

The second carpet part B has a backing of preferably spun web polyester. In this case where the carpet is to be installed in accordance with the system disclosed in U.S. Pat. No. 4,822,658, the backing will have needled filaments or loops 31. Such loops are normally locked into the backing 29 by a binder or adhesive 33 applied to the back of backing 29 opposite the exposed loops 31, a second spun web layer 35 may be added and attached to layer 29 by the binder 33 or an additional binder or adhesive (not shown) may be added after binder 33 has cured. The whole of second carpet part B will normally be attached to a first carpet part A by a light adhesive or binder coat 37. Such binder coat is normally kept to the minimum in order to maintain some voids or spaces around the tuft bundles.

Depending upon the method used to tuft the pile into the primary layer of the carpet, and the style of carpet, a significant number of nylon filaments will be located below the backing. The amount of filament which remains below the carpet backing is determined to a large extent by the type of stitch used in the manufacture of the carpet. With a straight stitch 10–15% remains below the carpet, whereas with a graphic stitch the amount can be as much as 50% or more. In any event, whether they are calculated by theoretical expansion or by actual tests, the exact degree of expansion and contraction under conditions of temperature and humidity of the first carpet part A can be determined. The preferred way is to wet the first carpet part under relatively warm conditions and allow the carpet to expand to its maximum width. The piece can then be fixed in place at its edges and the contraction force can then be determined.

When this force is known, the amount of stability needed in the second carpet part or secondary backing to resist this force will then be known. The second carpet part can first be tested for stability by simple pull tests by placing such part in tension along any dimension and applying pulling force.

The carpet backing can simply be layered as required with woven or non-woven material and preferably thermally bonded, point bonded or non-point bonded spun web material, more preferably polyester. Such material is flexible, lightweight and not rigid, but it resists movement in the plane of the layer. A layer of slab foam or mechanically frothed foam can also be interposed.

As shown in FIG. 4, a layer of polyurethane foam 13 can also be included as part of a carpet construction of the present invention. This can be added both to provide cushioning and mass to the carpet in this case, binder 21 is applied to the back of the primary backing and spun web layer 41 is applied in line to be bonded directly thereto. Foam layer 13 can be applied directly in line by mechanical forthing or it can be chemically blown. Tricot layer 43 having locked loops 45 on its underside is applied in line to the foam. Alternatively, a foam (which can be slab foam) and tricot composite can be separately manufactured and adhesive used to secure the foam and spun web layers.

What is claimed is:

1. A carpet for installation on a floor by means of hooks that are complementary and attachable to loops on a back side of the carpet, the carpet comprising;

a primary layer with pile substantially covering a first side of the layer, the pile tufted through the primary layer to leave tuft bundles on a second side of the primary layer;

a first binder encapsulating the tuft bundles to secure the pile and layer together, the binder containing voids within and around the tuft bundles to allow for expansion and contraction of the bundles;

a backing layer comprising a spun web substrate having the loops needled into and through the substrate and the binder locks the loops in the backing layer, the backing layer having a first side secured to the second side of the primary layer and a second side having said loops thereacross, the loops being locked in the backing layer; and a coating applied to the substrate to reduce the penetration of the binder into the substrate.

2. The carpet of claim 1 wherein the backing layer includes a foam layer located intermediate the primary layer and the loops.

3. The carpet of claim 1 wherein the pile is nylon.

4. The carpet of claim 1 wherein the primary layer is polypropylene.

5. The carpet of claim 1 wherein the binder includes a fire retardant chemical.

6. The carpet of claim 1 wherein the loops are needled into the substrate by a malimo process.

7. A carpet for installation on a floor by means of hooks that are complementary and attachable to loops on a back side of the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder containing voids within and around the tuft bundles to allow for expansion and contraction of the bundles; and a backing layer comprising a first spun web substrate having loops needled into and through the substrate and a second binder locking the loops in the backing layer, and having a first side secured to the second side of the primary layer and a second side having said loops thereacross.

8. The carpet of claim 7 wherein a coating is applied to the substrate to reduce the penetration of the second binder into the substrate.

9. The carpet of claim 7 wherein the backing layer includes a second spun web substrate located between the first spun web substrate and the primary layer.

10. The carpet of claim 9 wherein the first spun web substrate is secured to the second spun web substrate by said second binder.

11. The carpet of claim 10 wherein the first spun web substrate is relatively light and the second spun web substrate is relatively heavy.

12. The carpet of claim 7 wherein the second binder is selected from latex, ethylene vinyl acetate and urethane.

13. The carpet of claim 7 wherein the backing layer includes a foam layer located intermediate the primary layer and the loops.

14. The carpet of claim 7 wherein the pile is nylon.

15. The carpet of claim 7 wherein the primary layer is polypropylene.

16. The carpet of claim 7 wherein the binder includes a fire retardant chemical.

17. A carpet for installation on a floor by means of hooks that are complementary and attachable to loops on a back side the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder being sufficiently malleable to permit expansion of encapsulated tuft bundles so as to preclude substantial expansion of the carpet; and a backing layer comprising a first spun web substrate having loops needled into and through the substrate and a second binder which locks the loops in the backing layer, and a first side secured to the second side of the primary layer and a second side having said loops thereacross.

18. The carpet of claim 17 wherein a coating is applied to the substrate to reduce the penetration of the second binder into the substrate.

19. The carpet of claim 17 wherein the backing layer includes a second spun web substrate located between the first spun web substrate and the primary layer.

20. The carpet of claim 19 wherein the first spun web substrate is secured to the second spun web substrate by said second binder.

21. The carpet of claim 20 wherein the first spun web substrate is relatively light and the second spun web substrate is relatively heavy.

22. The carpet of claim 17 wherein the backing layer includes a foam layer located intermediate the primary layer and the loops.

23. The carpet of claim 22 wherein the backing layer includes a spun web substrate intermediate the primary layer and the foam layer.

24. The carpet of claim 23 wherein the spun web substrate is secured to the primary layer by the binder.

25. The carpet of claim 23 wherein the foam layer is slab foam.

26. The carpet of claim 23 wherein the foam layer is mechanically frothed foam.

27. The carpet of claim 26 wherein the foam layer is directly bonded to the binder.

28. The carpet of claim 17 wherein the pile is nylon.

29. The carpet of claim 17 wherein the primary layer is polypropylene.

30. The carpet of claim 17 wherein the second binder is selected from latex, ethylene vinyl acetate and urethane.

31. The carpet of claim 17 wherein the binder includes a fire retardant chemical.

32. The carpet of claim 17 wherein the backing layer includes a foam layer located intermediate the primary layer and the loops.

33. The carpet of claim 17 wherein the pile is nylon.

34. The carpet of claim 17 wherein the primary layer is polypropylene.

35. The carpet of claim 17 wherein the binder includes a fire retardant chemical.

36. A carpet for installation on a floor by means of hooks that are complementary and attachable to loops on a back side of the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder containing voids within and around the tuft bundles to allow for expansion and contraction of the bundles; and a backing layer having a first side secured to the second side of the primary layer, the backing layer comprising a foam layer located intermediate the primary layer and the loops and a first spun web substrate intermediate the primary layer and the foam layer, there being a second side of the backing layer having said loops thereacross, the loops being locked in the backing layer.

37. The carpet of claim 36 wherein the spun web substrate is secured to the primary layer by the binder.

38. The carpet of claim 36 wherein the foam layer is slab foam.

39. The carpet of claim 36 wherein the foam layer is mechanically frothed foam.

40. The carpet of claim 39 wherein the foam layer is directly bonded to the binder.

41. The carpet of claim 36 wherein the pile is nylon.

42. The carpet of claim 36 wherein the primary layer is polypropylene.

43. The carpet of claim 36 wherein the binder includes a fire retardant chemical.

44. The carpet of claim 36 wherein the backing layer includes a second spun web substrate having the loops needled into and through the substrate and a second binder locks the loops in the backing layer.

45. A carpet for installation on a floor by means of hooks that are complementary and attachable to loops on a back side of the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder containing voids within and around the tuft bundles to allow for expansion and contraction of the bundles; and a backing layer comprising a point bonded spun web substrate having the loops needled into and through the substrate and the binder locks the loops in the backing layer and having a first side secured to the second side of the primary layer and a second side having said loops thereacross.

46. The carpet of claim 45 wherein a coating is applied to the substrate to reduce the penetration of the binder into the substrate.

47. The carpet of claim 45 wherein the backing layer includes a foam layer located intermediate the primary layer and the loops.

48. The carpet of claim 45 wherein the substrate is non-woven.

49. The carpet of claim 45 wherein the substrate is thermally bonded polyester.

50. The carpet of claim 45 wherein the pile is nylon.

51. The carpet of claim 45 wherein the primary layer is polypropylene.

52. The carpet of claim 45 wherein the binder includes a fire retardant chemical.

53. The carpet of claim 45 wherein the loops are needled into the substrate by a malimo process.

54. A carpet for installation on a floor by means of hooks that are complementary and attachable to loops on a back side of the carpet, the carpet comprising:
a primary layer with pile substantially covering a first side of the layer, the pile tufted through the primary layer to leave tuft bundles on a second side of the primary layer;
a first binder encapsulating the tuft bundles to secure the pile and layer together, the binder containing voids within and around the tuft bundles to allow for expansion and contraction of the bundles; and
a backing layer comprising a non-woven spun web substrate having the loops needled into and through the substrate and the binder locks the loops in the backing layer and having a first side secured to the second side of the primary layer and a second side having said loops thereacross.

55. The carpet of claim 54 wherein a coating is applied to the substrate to reduce the penetration of the binder into the substrate.

56. The carpet of claim 54 wherein the backing layer includes a foam layer located intermediate the primary layer and the loops.

57. The carpet of claim 54 wherein the substrate is point bonded.

58. The carpet of claim 54 wherein the substrate is thermally bonded polyester.

59. The carpet of claim 54 wherein the pile is nylon.

60. The carpet of claim 54 wherein the primary layer is polypropylene.

61. The carpet of claim 54 wherein the binder includes a fire retardant chemical.

62. The carpet of claim 54 wherein the loops are needled into the substrate by a malimo process.

63. A carpet for installation on a floor by means of hooks that are complementary and attachable to loops on a back side of the carpet, the carpet comprising:
a primary layer with pile substantially covering a first side of the layer, the pile tufted through the primary layer to leave tuft bundles on a second side of the primary layer;
a first binder encapsulating the tuft bundles to secure the pile and layer together, the binder containing voids within and around the tuft bundles to allow for expansion and contraction of the bundles; and
a backing layer comprising a thermally bonded polyester spun web substrate having the loops needled into and through the substrate and the binder locks the loops in the backing layer and having a first side secured to the second side of the primary layer and a second side having said loops thereacross.

64. The carpet of claim 63 wherein a coating is applied to the substrate to reduce the penetration of the binder into the substrate.

65. The carpet of claim 63 wherein the backing layer includes a foam layer located intermediate the primary layer and the loops.

66. The carpet of claim 63 wherein the substrate is point bonded.

67. The carpet of claim 63 wherein the substrate is non-woven.

68. The carpet of claim 63 wherein the pile is nylon.

69. The carpet of claim 63 wherein the primary layer is polypropylene.

70. The carpet of claim 63 wherein the binder includes a fire retardant chemical.

71. The carpet of claim 63 wherein the loops are needled into the substrate by a malimo process.

72. A carpet for installation on a floor by means of hooks that are complementary and attachable to loops on a back side the carpet, the carpet comprising:
a primary layer with pile substantially covering a first side of the layer, the pile tufted through the primary layer to leave tuft bundles on a second side of the primary layer;
a first binder encapsulating the tuft bundles to secure the pile and layer together, the binder being sufficiently malleable to permit expansion of encapsulated tuft bundles so as to preclude substantial expansion of the carpet; and
a backing layer having a first side secured to the second side of the primary layer, the backing layer comprising a foam layer located intermediate the primary layer and the loops and a first spun web substrate intermediate the primary layer and the foam layer, there being a second side having said loops thereacross, the loops being locked in the backing layer.

73. The carpet of claim 72 wherein the pile is nylon.

74. The carpet of claim 72 wherein the primary layer is polypropylene.

75. The carpet of claim 72 wherein the binder includes a fire retardant chemical.

76. The carpet of claim 72 wherein the backing layer includes a second spun web substrate having loops needled into and through the substrate and a second binder locks the loops in the backing layer.

77. A carpet for installation on a floor by means of hooks that are complementary and attachable to loops on a back side the carpet, the carpet comprising:
a primary layer with pile substantially covering a first side of the layer, the pile tufted through the primary layer to leave tuft bundles on a second side of the primary layer;
a first binder encapsulating the tuft bundles to secure the pile and layer together, the binder being sufficiently malleable to permit expansion of encapsulated tuft bundles so as to preclude substantial expansion of the carpet; and
a backing layer comprising a point bonded spun web substrate having the loops needled into and through the substrate and the binder locks the loops in the backing layer and having a first side secured to the second side of the primary layer and a second side having said loops thereacross.

78. The carpet of claim 77 wherein a coating is applied to the substrate to reduce the penetration of the binder into the substrate.

79. The carpet of claim 77 wherein the loops are needled into the substrate by a malimo process.

80. The carpet of claim 77 wherein the backing layer includes a foam layer located intermediate the primary layer and the loops.

81. The carpet of claim 77 wherein the pile is nylon.

82. The carpet of claim 77 wherein the primary layer is polypropylene.

83. The carpet of claim 77 wherein the binder includes a fire retardant chemical.

84. A carpet for installation an a floor by means of hooks that are complementary and attachable to loops on a back side the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder being sufficiently malleable to permit expansion of encapsulated tuft bundles so as to preclude substantial expansion of the carpet; and a backing layer comprising a non-woven spun web substrate having the loops needled into and through the substrate and the binder locks the loops in the backing layer and having a first side secured to the second side of the primary layer and a second side having said loops thereacross.

85. The carpet of claim 84 wherein a coating is applied to the substrate to reduce the penetration of the binder into the substrate.

86. The carpet of claim 84 wherein the backing layer includes a foam layer located intermediate the primary layer and the loops.

87. The carpet of claim 84 wherein the substrate is point bonded.

88. The carpet of claim 84 wherein the substrate is thermally bonded polyester.

89. The carpet of claim 84 wherein the pile is nylon.

90. The carpet of claim 84 wherein the primary layer is polypropylene.

91. The carpet of claim 84 wherein the binder includes a fire retardant chemical.

92. The carpet of claim 84 wherein the loops are needled into the substrate by a malimo process.

93. A carpet for installation on a floor by means of hooks that are complementary and attachable to loops on a back side the carpet, the carpet comprising:

a primary layer with pile substantially covering a first side of the layer, the pile tufted through the primary layer to leave tuft bundles on a second side of the primary layer;

a first binder encapsulating the tuft bundles to secure the pile and layer together, the binder being sufficiently malleable to permit expansion of encapsulated tuft bundles so as to preclude substantial expansion of the carpet; and a backing layer comprising a thermally bonded polyester spun web substrate having the loops needled into and through the substrate and the binder locks the loops in the backing layer and having a first side secured to the second side of the primary layer and a second side having said loops thereacross.

94. The carpet of claim 93 wherein a coating is applied to the substrate to reduce the penetration of the binder into the substrate.

95. The carpet of claim 93 wherein the backing layer includes a foam layer located intermediate the primary layer and the loops.

96. The carpet of claim 93 wherein the substrate is point bonded.

97. The carpet of claim 93 wherein the substrate is non-woven.

98. The carpet of claim 93 wherein the pile is nylon.

99. The carpet of claim 93 wherein the primary layer is polypropylene.

100. The carpet of claim 93 wherein the binder includes a fire retardant chemical.

101. The carpet of claim 93 wherein the loops are needled into the substrate by a malimo process.

\* \* \* \* \*

UNITED STATES PATENT AND TRADEMARK OFFICE
CERTIFICATE OF CORRECTION

PATENT NO. : 6,217,974 B1
DATED : April 17, 2001
INVENTOR(S) : Joseph R. Pacione Page 1 of 1

It is certified that error appears in the above-identified patent and that said Letters Patent is hereby corrected as shown below:

Claim 1, column 8,
Line 39, change ";" after the word "comprising" to -- : --.

Claim 84, column 13,
Line 1, change "an" to -- on --.

Signed and Sealed this

Second Day of October, 2001

Attest:

NICHOLAS P. GODICI
Attesting Officer
Acting Director of the United States Patent and Trademark Office

Disclaimer 6,217,974—Joseph R. Pacione, Thornhill, CA. CARPET AND LAYERED BACKING FOR DIMENSIONAL STABILITY AND INTEGRITY. Patent dated April 17, 2001. Disclaimer filed April 22, 2002, by the assignee, Tac-Fast Georgia, L.L.C.

The term of this patent shall not extend beyond the expiration date of Pat. No. 5,654,066.
*(Official Gazette, July 16, 2002)*

UNITED STATES PATENT AND TRADEMARK OFFICE
CERTIFICATE OF CORRECTION

PATENT NO. : 6,217,974 B1 Page 1 of 1
DATED : April 17, 2001
INVENTOR(S) : Joseph R. Pacione It is certified that error appears in the above-identified patent and that said Letters Patent is hereby corrected as shown below:

Title page,
In the first column, before the line beginning "(51)", insert:
-- Related U.S. Application Data
[63]   Continuation-in-part of application No. 08/489,156, June 9, 1995, now U.S. Patent No. 5,654,066, issued August 5, 1997. --

Column 1,
Line 4, beneath the title, insert:
-- This application is a continuation application of international patent application No. PCT/CA 96/00406 filed June 10, 1996, designating the United States, which application is a Continuation-in-Part Application of prior United States Application Serial No. 08/489,156, filed June 9, 1995, now United States Patent No. 5,654,066, issued August 5, 1997. --

Signed and Sealed this

Seventh Day of January, 2003

JAMES E. ROGAN
*Director of the United States Patent and Trademark Office*